Nov. 18, 1969     R. H. SWAISGOOD     3,478,878

SOLDERING APPARATUS

Filed Nov. 18, 1966

INVENTOR.
RALPH H. SWAISGOOD

BY
Anderson, Spangler & Wymore

United States Patent Office 3,478,878
Patented Nov. 18, 1969

3,478,878
SOLDERING APPARATUS
Ralph H. Swaisgood, Fort Collins, Colo., assignor to Storm Products Company, Los Angeles, Calif., a corporation of California
Filed Nov. 18, 1966, Ser. No. 595,465
Int. Cl. B01d 33/00
U.S. Cl. 210—70                                11 Claims

ABSTRACT OF THE DISCLOSURE

Dross removal apparatus and method for removal of dross from a portion of a liquid bath comprising a container of a material non-wettable by the liquid having sidewalls tapering from a larger upper opening to a lower smaller opening and means for lowering and raising the container into and out of the liquid bath to provide a dross-free surface on the liquid when positioned within the container.

---

This invention relates to a new and improved soldering apparatus and, more specifically, to a method of dross removal in dip soldering.

Soldering is a metal joining process wherein coalescence is produced by heating, generally below 800° F. and by using a non-ferrous filler material that has a melting point below that of the base metal. The filler metal, after it has been properly wetter to the base metal, is distributed between the properly fitted parts by capillary attraction. Different equipment, process and procedure, all having their certain advantages and disadvantages, are used to accomplish this effect. Since the present invention has application only in dip-type soldering, the following discussion will be limited to that aspect.

The current demands of industry have required a large need for precut lengths of electrical wire having their ends stripped and precoated with solder. The common method of "tinning" has been to manually dip the wires in a solder pot. When the molten solder is wetted to the wire ends, it is imperative that a clean, oxide-free surface exist to insure proper capillary action and a sound bond. The prefluxing of the wire ends is effective in removing oxides and other non-metallic materials, along with promoting the wetting of the base metal surfaces.

In maintaining the solder in the molten condition, a layer of material called "dross" continually forms on the surface thereof. The dross is caused by oxidation of the solder, flux residue and various other impurities. To maintain the proper bonding and capillary action as above-mentioned, it is necessary to keep the molten surface of the solder free from dross while the wire ends are being dipped.

One method in the prior art has been accomplished by manually skimming or sweeping the surface of the molten solder at frequent intervals. The skimming is usually done with the use of a non-wetting material that can withstand the elevated temperatures without dissolving in the alloy and further contaminating it. Various other methods have been used to maintain a clean surface, such as a fountain produced by a pump positioned in the solder bath which draws the solder from the bottom of the pot. The primary disadvantage of this method is that the rate of oxidation is greatly increased due to the increased exposure to the atmosphere. Another problem is that the level of the solder in the fountain fluctuates and cannot be accurately controlled. As long as the dipping operation is done manually, the skimming of the pot is not a major problem but, in an automated dipping process, it becomes paramount.

The skimming technique of the present invention is accomplished by the insertion of a funnel through the surface layer of dross at a moment just prior to the dipping of the wires. The molten solder which rises up through the funnel provides a dross-free surface which will be later explained in detail. After a wire is dipped, the funnel is instantly raised out of the solder and then reinserted for the next wire, all of which takes place in a fraction of a second. The vertical movement of the funnel is sequentially related to the dipping operation. Although many dipping operations can be used for purposes of illustration, the operation can be carried out on a cam operated jig. The machine is of a turret-type with vertically acting dipping arms carrying the wires through a flux station and a soldering station in rapid succession. In addition to the novel skimming operation, the oxidation is minimized by maintaining an inert gas or liquid over the surface of the molten solder.

It is, therefore, the principal object of the present invention to provide a novel and improved dross skimming technique and apparatus for dip soldering.

Another object of the present invention is to provide a solder bath skimming operation which is fully automated and can be left unattended for extended periods of time.

Still another object of the invention is to provide a solder bath skimming technique which causes a minimal amount of solder oxidation.

Another object of the invention is to provide an automated high speed skimming operation for a solder bath which takes place after each individual dipping.

Still a further object of the invention is to provide a skimming technique which is simple to operate, reliable, low cost and durably constructed.

Other objects will be in part apparent and in part pointed out specifically hereinafter in connection with the description of the drawings that follows and in which.

Figure 1:
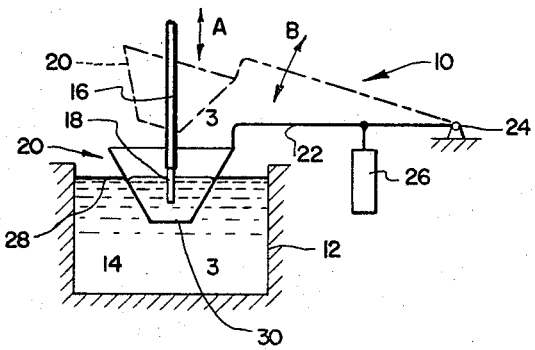
FIGURE 1 is a diagrammatic elevational view of a liquid solder bath and the skimming apparatus shown in the raised and lowered positions.
Figure 2:
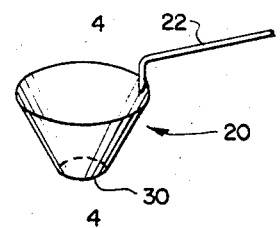
FIGURE 2 is a perspective view of the skimming funnel.

Referring now to the drawings and, more specifically, to FIGURE 1, an automated dip soldering operation is shown in simplified form and is generally identified by reference numeral 10. Various details of the system and the machine which dips the wires have not been shown since they are not a part of the instant invention. Solder pot 12, a standard in the trade, is electrically heated with temperature controls which maintains the solder bath 14 between 400° and 600° F. Heavy gauge wire or any dipped base metal which absorbs a large amount of heat requires higher solder pot temperatures. For illustrative purposes, an insulated wire 16 having a stripped end 18 is shown being dipped in the solder bath 14. The wire 16 is momentarily introduced into the bath in a vertical direction indicated by arrow A. The exposed end of the wire 18 is passed through a flux station prior to dipping to provide a properly wetted surface to which the solder can bond. To properly coat or tin the wire end 18, the surface of the solder bath must be free of all contaminants or what is commonly called dross. This function is performed by the swimming cone 20 which is the subject of the present invention.

The funnel 20 is mounted on arm 22 which rotates about pivot 24 in a direction indicated by arrow B. The arm 22 is actuated by cylinder 26 from the solid line position to the dotted line position as seen in FIGURE 1. The operation of the cylinder 26 is connected in sequence with the wire dipping machine so that between dippings, the cone 20 is raised out of the solder bath 14 and reinserted before the next wire is dipped.

Figure 3:
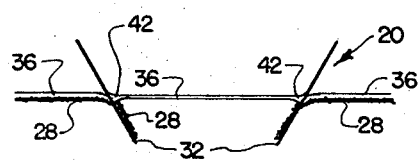
FIGURE 3 is a sectional view of the funnel positioned in the solder bath taken along lines 3—3 of FIGURE 1.
Figure 4:
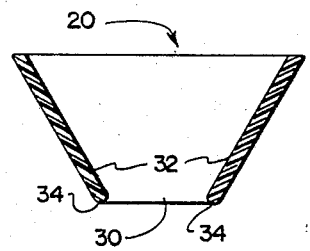
FIGURE 4 is a sectional view of an enlarged scale taken along lines 4—4 of FIGURE 2.

The dross material 28 which floats on the surface is a combination of oxides, flux residue, dirt and other impurities. As the funnel 20 is brought into contact with the solder bath 14, the opening 30 encircles and separates an amount of dross equal to the area of opening 30. As the funnel 20 is lowered further, the solder rises in the funnel maintaining a constant level. As this takes place, the originally encircled dross begins to partially attach to the inside surface 32 of the cone 20 as seen in FIGURE 3. When the cone 20 is fully lowered, as shown in FIGURE 1, the area of the exposed solder is approximately fifteen times that of the opening area 30. What dross that has not attached to the side of the cone is stretched by a ratio of 10:1 to 20:1, which leaves an essentially clean surface. Ratios in the order of 4:1 and greater can be used. Since the movement of the cone 20 through the solder is fairly quick, it is necessary that the opening 30 in the bottom of the cone be sufficiently large so that the solder completely drains upon removal. A small opening also creates a gushing effect upon insertion which is also undesirable.

Each time that a wire 16 is dipped in the solder bath 14, the abovementioned cycle of raising and lowering the cone 20 takes place. This provides a dross-free solder bath which can be left unattended for extended periods of time. It is not always necessary to cycle the cone after each wire is dipped. In most instances, a plurality of wires may be tinned between each raising of the cone 20.

The cone 20 is constructed of a material which is non-wettable by the liquid being treated such as polished graphite, ceramics, Teflon or stainless steel. The edge 34 surrounding the opening 30 is rounded to assist in preventing solder particles or dross from attaching to the cone.

Figure 5:
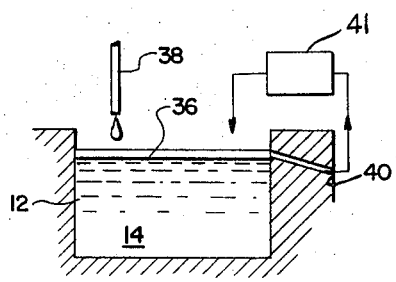
FIGURE 5 is a diagrammatic elevational view of a solder bath with an oxidation preventing layer of fluid on the surface thereof.

One of the primary causes of dross formation is surface oxidation of the solder bath 14. This problem is minimized by placing a thin layer of high temperature fluid 36 on the surface of the molten solder, as shown in FIGURE 5. Some high temperature oils, such as peanut oil and silicone base fluids, have been found to be acceptable. A thickness no greater than ⅛ inch has been found to be adequate. In FIGURE 5, the film is maintained by a continuous fluid flow source 38 and an overflow vent 40. This relatively slow flow provides a flushing action with any of the dross particles in the film 36. The vent 40 carries the excess fluid and contaminants to waste or circulates it through a filter such as that shown at 41. The film thereby provides the dual function of an oxidation barrier and a flushing media.

When the cone 20 is inserted in the solder bath 14, as shown in FIGURE 3, the solder inside the cone will form a concave meniscus around the edge thereof by reason of its refusal to wet with the cone. The oil layer or film 36 trapped within the cone will gather in the space 42 caused by the meniscus. By reason of the increased surface area inside the cone and the gathering around the edges, the oil film 36 is stretched very thin. The film in no way affects the wetting of the wire ends being dipped in the solder bath.

Figure 6:
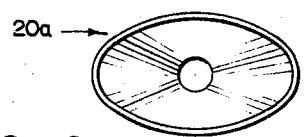
FIGURE 6 is a top view of an alternate embodiment of the skimming funnel.
Figure 8:
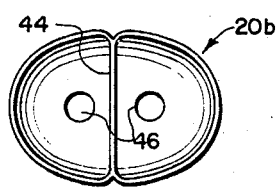
Figure 7:
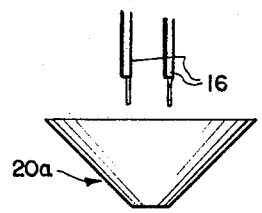
FIGURE 7 is a side elevational view of the alternate embodiment shown in FIGURE 6; and, FIGURE 8 is a top view of a further embodiment of the skimming funnel.

FIGURES 6 and 7 illustrate a modified form of the cone 20a in an oval shape. This configuration is better suited for dipping wires 16 in pairs as seen in FIGURE 7. FIGURE 8 defines a further modification in cone 20b. The cone is provided with a partition 44 giving an increased inner cone area and a pair of openings 46.

The present invention also has utility in a variety of hand operations. The common method of hand dipping wires can make use of a similar dipping cone 20. In place of cylinder 26, a foot or hand treadle type actuator could be used. In a hand operation where the dipping would be slower, the cone design could vary from that mentioned above. The ratio of the exposed solder to the end opening 30 can be increased above 20:1. The minimum area of opening 30 is also not critical since there is adequate time for allowing the solder to enter and leave the cone.

It is understood that variations from the form of this invention disclosed herein may be made without departure from the spirit and scope of the invention and that the drawings and specification are to be considered as merely illustrative rather than limiting.

What is claimed is:

1. Dross removal apparatus for use with a molten solder bath used in conjunction with a dip soldering operation which comprises in combination: a solder pot containing molten solder, a funnel constructed of a material non-wettable by solder having downwardly tapered side walls, an open top and bottom, the bottom opening being substantially smaller than the top, supporting and actuating means attached to said funnel adapted for vertically lowering and raising the bottom opening only of said funnel through the normal liquid level of the molten solder in the solder pot to provide the molten solder in said funnel which enters and exists only at the bottom of the funnel with a substantially dross-free surface.

2. Dross removal apparatus as set forth in claim 1 in which said side walls are conical in shape with circular openings in the bottom and top thereof.

3. Dross removal apparatus as set forth in claim 1 in which the side walls are conical in shape with elliptical shaped open ends.

4. Dross removal apparatus as set forth in claim 1 in which the container is elliptical shaped having an open top with inwardly tapered side walls, at least one vertically spaced partition walls dividing the container into at least two compartments, openings in the bottom of said container, one in each of said compartments.

5. Dross removal apparatus as set forth in claim 1 in which the bottom terminus of the side walls defines said bottom opening having a rounded edge whereby the molten solder has less of a tendency to adhere thereto.

6. Dross removal apparatus as set forth in claim 1 in which the side walls are conical in shape having a concentric circular bottom opening at the lower terminus thereof, the ratio of areas of the top opening and the bottom opening is in the range of approximately 4:1 to 30:1.

7. Dross removal apparatus as set forth in claim 1 including an oxygen barrier comprising a thin film of fluid maintained on the surface of the solder bath.

8. Dross removal apparatus as set forth in claim 1 including an oxygen barrier on the surface of the solder bath comprised of a thin layer of oil, and circulating means for flushing the flux-residue-loaded oil away from the surface of the bath.

9. The improved method for removing contaminants from a portion of the surface of a liquid preparatory to introducing a work piece therein comprising the steps of: passing the small end only of a funnel constructed of a material which is non-wettable by said liquid through a surface layer of contaminants and down into the liquid so as to permit said liquid and a small area of contaminants isolated by introduction of said funnel to rise into the interior of the latter with an ever increasing surface area whereby the surface becomes substantially contaminant-free, and introduction of said work piece into that portion of said liquid contained within the funnel where said liquid surface is free of contaminants.

10. The improved method as set forth in claim 9 for removing contaminants from a portion of the surface of a liquid wherein the liquid is solder which includes the steps of: covering the surface of the molten solder with a thin film of a high temperature fluid so as to provide an oxidation barrier between the solder bath and the atmosphere.

11. The improved method as set forth in claim 9 for removing contaminants from a portion of the surface of a liquid wherein the liquid is solder which includes the steps of: covering the surface of the molten solder with a thin layer of high temperature oil so as to provide an oxidation barrier and circulating said layer of oil through a filtering means whereby the contaminants suspended in said oil are removed from the surface of the solder bath.

References Cited
UNITED STATES PATENTS

| | | | |
|---|---|---|---|
| 1,307,686 | 6/1919 | Linden | 210—74 X |
| 1,355,070 | 10/1920 | Allen | 210—532 |
| 2,264,703 | 12/1941 | Lenz | 117—114 X |
| 2,397,400 | 3/1946 | Barwich | 117—114 X |
| 2,625,270 | 1/1953 | De Armas | 210—251 X |
| 2,636,609 | 4/1953 | Blanchet | 210—532 X |
| 2,703,552 | 3/1955 | Hamilton | 118—612 |
| 2,721,149 | 10/1955 | Nelson. | |
| 2,875,094 | 2/1959 | Bloem et al. | 118—422 X |

REUBEN FRIEDMAN, Primary Examiner

JOHN ADEE, Assistant Examiner

U.S. Cl. X.R.

117—114, 422, 603; 210— 73, 83, 322, 540